(12) United States Patent  
Ukai et al.

(10) Patent No.: US 6,727,455 B1
(45) Date of Patent: Apr. 27, 2004

(54) POWER SUPPLY SYSTEM FOR APPLYING A VOLTAGE OF BOTH POSITIVE AND NEGATIVE POLARITIES IN ELECTRIC DISCHARGE MACHINING

(75) Inventors: Yoshikazu Ukai, Tokyo (JP); Seiji Satou, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/048,930
(22) PCT Filed: Jun. 6, 2000
(86) PCT No.: PCT/JP00/03654
    § 371 (c)(1),
    (2), (4) Date: May 8, 2002
(87) PCT Pub. No.: WO01/94067
    PCT Pub. Date: Dec. 13, 2001

(51) Int. Cl.[7] .................................................. B23H 1/02
(52) U.S. Cl. .................................. 219/69.18; 219/69.13
(58) Field of Search ........................... 219/69.13, 69.18

(56) References Cited

U.S. PATENT DOCUMENTS 6,465,754 B1 * 10/2002 Balleys

FOREIGN PATENT DOCUMENTS

| JP | 61-4620 A | * | 1/1986 | ............ 219/69.13 |
| JP | 61-192415 A | * | 8/1986 | ............ 219/69.13 |
| JP | 1-257513 | | 10/1989 | |
| JP | 3-79221 | | 4/1991 | |
| JP | 5-329710 A | * | 12/1993 | |
| JP | 10-244423 A | * | 9/1998 | |

* cited by examiner

*Primary Examiner*—Geoffrey S. Evans
(74) *Attorney, Agent, or Firm*—Sughrue Mion, PLLC (57) ABSTRACT

In an electric discharge machining power supply system that can apply a voltage of both positive and negative polarities between an electrode and a workpiece, there is provided a controller that applies a first voltage pulse between the electrodes for a predetermined time T1, and then applies a second voltage pulse having a polarity opposite to the first voltage pulse for a predetermined time T2a required until the voltage between the electrodes is lowered to a predetermined voltage that is less than an electric discharge starting voltage Va, after a predetermined time t that is set to prevent breakdown of a switching circuit has lapsed. In electric discharge machining using this electric discharge machining power supply system, the stable machining having high machining quality can be accomplished by causing a remaining voltage between the electrodes to fall down quickly and remove.

7 Claims, 5 Drawing Sheets

POWER SUPPLY SYSTEM FOR APPLYING A VOLTAGE OF BOTH POSITIVE AND NEGATIVE POLARITIES IN ELECTRIC DISCHARGE MACHINING

This application is a 371 of PCT/JP00/03654 filed Jun. 6, 2000.

TECHNICAL FIELD

The present invention relates to the improvement in an electric discharge machining power supply system employed in the electric discharge machining, which executes the machining of the workpiece by generating the electric discharge between the electrode and the workpiece as the electrode, to supply a machining power between the electrodes.

BACKGROUND ART

The electric discharge machining generates the electric discharge between electrodes by supplying the DC voltage between the electrode and the workpiece from the DC power supply of the electric discharge machining power supply system to proceed the machining while moving the workpiece relatively to the electrode.

The DC voltage supplied between the electrode and the workpiece is controlled by turning ON/OFF the switching means. The inter-electrode voltage does not quickly fall down because of the presence of the stray electrostatic capacitance between the electrodes and the inductance of the circuit, etc. after the switching means is turned OFF, and thus the situation that the voltage still remains between the electrodes is caused. In case the electric discharge is not generated at the end of the voltage pulse, the remaining voltage between the electrodes immediately after the turning OFF of the switching means is substantially equal to the applied voltage and the voltage that is in excess of the electric discharge starting voltage still remains between the electrodes. Thus, there is the possibility that the electric discharge is generated.

Also, an amount of energy stored by the stray electrostatic capacitance between the electrodes and the inductance of the circuit, etc. is changed depending on the size of the workpiece, the machining condition, the gap between the electrodes, the length of the lead wire of the circuit, etc. and is not constant. Thus, since a time required to consume the energy is changed and the energy at the generation of the electric discharge becomes different, it is difficult to realize the stable machining.

The electric discharge generated due to the remaining voltage between the electrodes in the quiescent time from the end of the voltage application between the electrode (OFF of the switching means) to the subsequent voltage application (ON of the switching means) is different from the electric discharge in the time period in which the proper electric discharge is intended, and therefore such electric discharge is out of the control range. This remaining voltage between the electrodes is changed gradually with the falling of the voltage and thus an amount of supplied energy is not fixed. Thus, there is the problem that the machining quality is lowered.

In addition, there is the problem that, when the relative movement between the electrode and the workpiece is executed by the inter-electrode voltage, the electric discharge machining cannot be carried out at a desired gap between the electrodes because of the presence of the remaining voltage between the electrodes.

Further, the electrostatic force is generated between the electrode and the workpiece by the remaining voltage between the electrodes. In particular, in the case of the wire electric discharge machining, there is the problem that the machining precision of the workpiece is lowered by the vibration of the wire electrode due to this electrostatic force.

Figure 7:
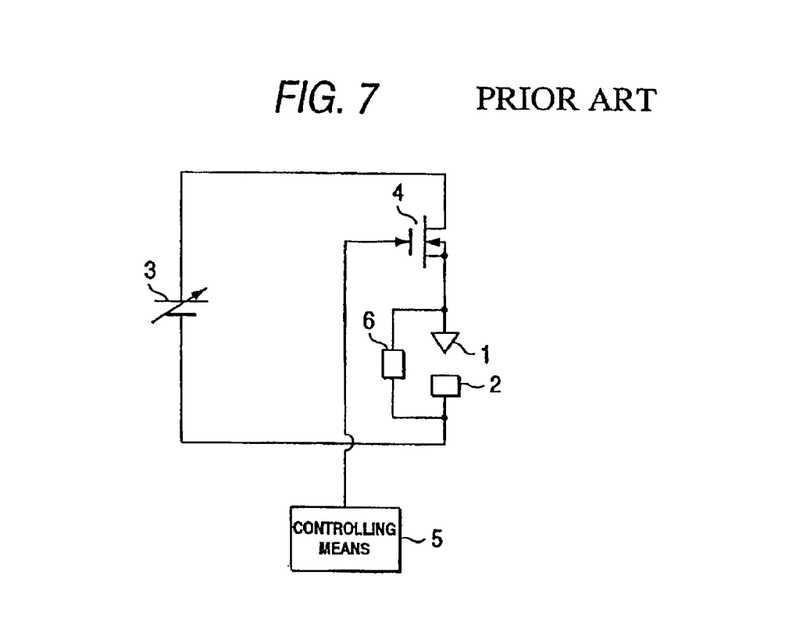
FIG. 7 is a block diagram showing a configuration of the electric discharge machining power-supply system in the prior art.

FIG. 7 is a block diagram showing a configuration of the electric discharge machining power supply system in the prior art. In FIG. 7, 1 is an electrode, 2 is a workpiece, 3 is a DC power supply for supplying the DC voltage between the electrode 1 and the workpiece 2, 4 is a switching means, 5 is a controlling means for controlling ON/OFF of the switching means 4, and 6 is a gap resistance. A structure in which the remaining energy between the electrodes is consumed by adding the gap resistance 6 between the electrode 1 and the workpiece 2 is employed.

Figure 8:
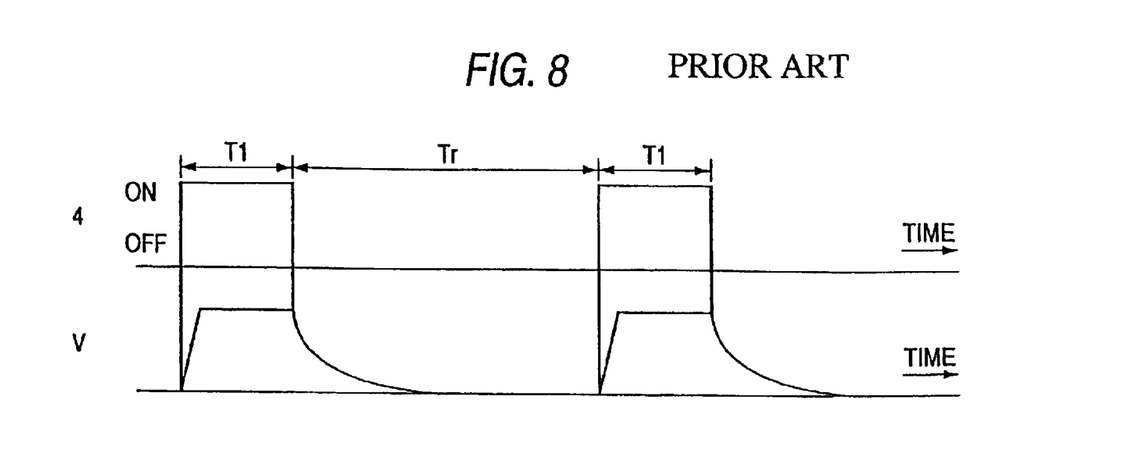
FIG. 8 is a view showing inter-electrode voltage waveforms in the electric discharge machining power supply system in the prior art.

FIG. 8 is a view showing an inter-electrode voltage waveform in the electric discharge machining power supply system having the circuit configuration shown in FIG. 7 in the prior art. In FIG. 8, V is an inter-electrode voltage, T1 is a voltage pulse applying time, and Tr is a quiescent time. Since the inter-electrode voltage V is reduced like an exponential function after the switching means 4 is turned OFF, it is impossible to render the inter-electrode voltage V to fall down quickly.

In this manner, according to the method of consuming the energy remaining between the electrodes by the gap resistance between the electrodes, since a time is required to consume the remaining energy between the electrodes, it is difficult to shorten the quiescent time. In addition, there still remains the possibility that the electric discharge is generated on the outside of the control range until the voltage is reduced below the electric discharge starting voltage.

Besides, in the Unexamined Japanese Patent Application Publication No.Heil-257513, the electric discharge machining power supply system which is capable of improving the machining quality of the workpiece and also preventing the electrolytic corrosion by changing the polarity of the voltage pulse every predetermined number of the voltage pulses is disclosed. But there is no disclosure to cause the voltage pulse between the electrodes to fall down quickly. Since the voltage remaining between the electrodes does not quickly fall down after the end of voltage application, there is the time in which the voltage is in excess of the electric discharge starting voltage. There are the problems that it is difficult to suppress the generation of the electric discharge during this time, etc.

DISCLOSURE OF THE INVENTION

The present invention has been made to overcome above problems, and it is an object of the present invention to obtain an electric discharge machining power supply system capable of achieving the stable electric discharge machining having high machining quality.

Also, it is another object of the present invention to obtain an electric discharge machining power supply system capable of preventing the electrolytic corrosion of the workpiece and capable of shortening the machining time.

An electric discharge machining power supply system according to the present invention comprises a DC power supply for supplying a DC voltage between an electrode and a workpiece, switching means for switching the DC voltage, and a controlling means for controlling ON/OFF of the switching means, whereby a voltage of both positive and negative polarities can be applied between electrodes, wherein the controlling means applies a first voltage pulse between the electrodes for a predetermined time, and then applies a second voltage pulse having a polarity opposite to the first voltage pulse for a predetermined time until the voltage between the electrodes is lowered to a predetermined voltage that is less than an electric discharge starting voltage.

Also, an electric discharge machining power supply system according to the present invention comprises a DC power supply for supplying a DC voltage between an electrode and a workpiece, switching means for switching the DC voltage, and a controlling means for controlling ON/OFF of the switching means, whereby a voltage of both positive and negative polarities can be applied between electrodes, wherein the controlling means applies a first voltage pulse between the electrodes for a predetermined time, and then applies a second voltage pulse having a polarity opposite to the first voltage pulse at a predetermined period for a predetermined time such that the voltage between the electrodes is within a predetermined voltage range that is less than an electric discharge starting voltage.

Also, an electric discharge machining power supply system according to the present invention comprises a DC power supply for supplying a DC voltage between an electrode and a workpiece, switching means for switching the DC voltage, and a controlling means for controlling ON/OFF of the switching means, whereby a voltage of both positive and negative polarities can be applied between electrodes, the system further comprises a voltage detecting means for detecting the voltage between the electrodes, a voltage comparing means for comparing an inter-electrode voltage detected by the voltage detecting means with a predetermined voltage that is set lower than an electric discharge starting voltage, and a controlling means for controlling ON/OFF of the switching means, that apply a second voltage pulse having a polarity opposite to the first voltage pulse such that the inter-electrode voltage is set within a predetermined voltage range that is less than an electric discharge starting voltage, based on a compared value obtained by the voltage comparing means after a first voltage pulse is applied between the electrodes for a predetermined time.

Also, in the electric discharge machining power supply system according to the present invention, after application of the first voltage pulse is ended, the second voltage pulse is applied after a predetermined time has lapsed to prevent breakdown of the switching means.

Also, an electric discharge machining power supply system according to the present invention comprises a DC power supply for supplying a DC voltage between an electrode and a workpiece, switching means for switching the DC voltage, and a controlling means for controlling ON/OFF of the switching means, whereby a voltage of both positive and negative polarities can be applied between electrodes, the system further comprises a voltage detecting means for detecting the voltage between the electrodes, a voltage comparing means for comparing an inter-electrode voltage detected by the voltage detecting means with a predetermined voltage that is set lower than an electric discharge starting voltage, an average voltage detecting means for detecting an average voltage between the electrodes, an average voltage comparing means for comparing the average voltage between the electrodes detected by the average voltage detecting means with a zero bolt, and a controlling means for controlling ON/OFF of the switching means, that apply a second voltage pulse having a polarity opposite to the first voltage pulse such that the inter-electrode voltage is set within a predetermined voltage range that is less than an electric discharge starting voltage, based on a compared value obtained by the voltage comparing means after a first voltage pulse is applied between the electrodes for a predetermined time, controlling ON/OFF of the switching means, that apply a fourth voltage pulse having a same polarity as the first voltage pulse such that the inter-electrode voltage is set within a predetermined voltage range that is less than the electric discharge starting voltage, based on the compared value obtained by the voltage comparing means after a third voltage pulse having a polarity opposite to the first voltage pulse is applied between the electrodes for a predetermined time, and controlling the average voltage between the electrodes at a predetermined time interval into zero, based on the compared value obtained by the average voltage detecting means.

Also, in the electric discharge machining power supply system according to the present invention, the predetermined voltage that is less than the electric discharge starting voltage when the second voltage pulse is applied or the predetermined voltage that is less than the electric discharge starting voltage when the fourth voltage pulse is applied is set close to the electric discharge starting voltage.

Also, in the electric discharge machining power supply system according to the present invention, after application of the first voltage pulse is ended, the second voltage pulse is applied after a predetermined time has lapsed to prevent breakdown of the switching means, and, after application of the third voltage pulse is ended, the fourth voltage pulse is applied after a predetermined time has lapsed to prevent breakdown of the switching means.

Since the electric discharge machining power supply system according to the present invention is constructed as above, effects described in the following can be achieved.

In the electric discharge machining using the electric discharge machining power supply system according to the present invention, there can be achieved the effect that the stable machining having high machining quality can be executed effectively. In particular, if the wire electric discharge machining is employed in the electric discharge machining power supply system according to the present invention, the application frequency of the voltage pulse can be increased because the vibration of the wire electrode due to the electrostatic force can be suppressed, the electric discharge due to the remaining voltage between the electrodes can be suppressed, the feed of the wire electrode can be stabilized, etc. Therefore, there can be achieved the effect that the more effective wire electric discharge machining having high machining quality can be implemented.

In the electric discharge machining using the electric discharge machining power supply system according to the present invention, there can be achieved the effect that not only the electrolytic corrosion of the workpiece can be prevented but also the machining time can be shortened.

BEST MODES FOR CARRYING OUT THE INVENTION

Embodiment 1

Figure 1:
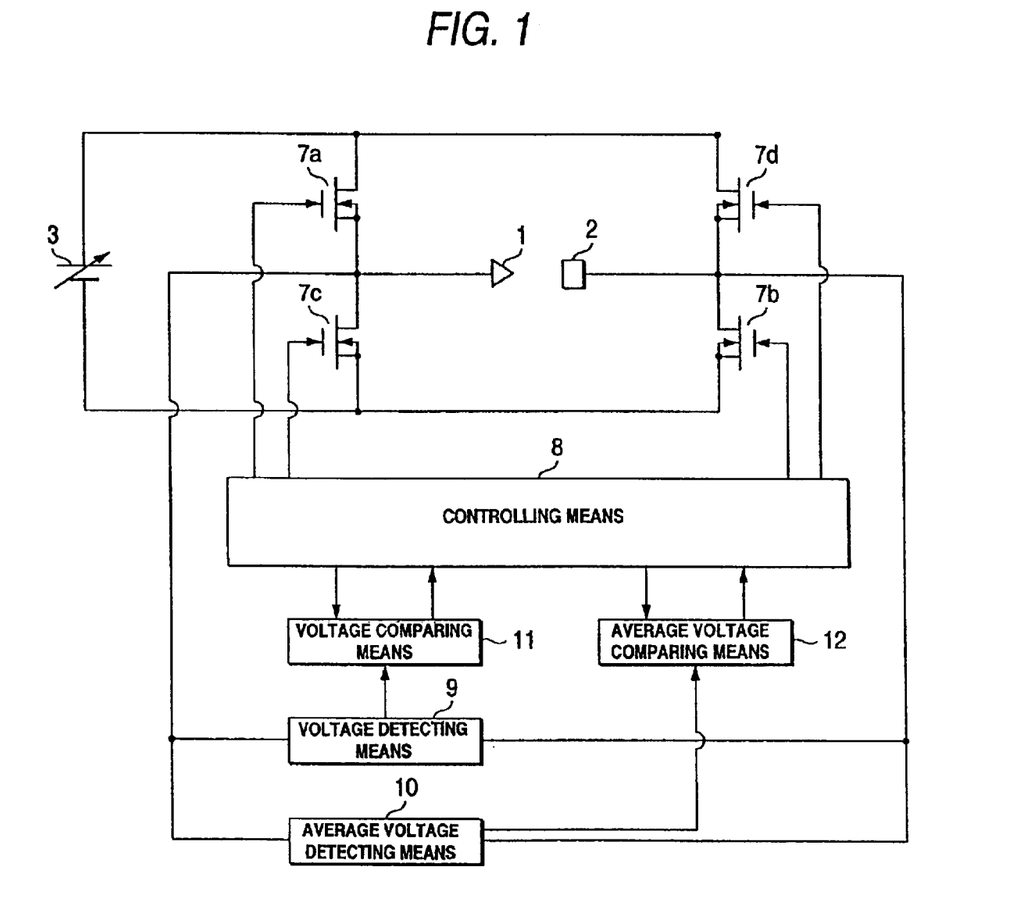
FIG. 1 is a block diagram showing a configuration of an electric discharge machining power supply system according to an embodiment 1 of the present invention.

FIG. 1 is a block diagram showing a configuration of an electric discharge machining power supply system according to an embodiment 1 of the present invention. In FIG. 1, 1 is an electrode, 2 is a workpiece, 3 is a DC power supply for supplying the DC voltage between the electrode 1 and the workpiece 2, 7a, 7b, 7c, and 7d are switching means such as a field effect transistor for switching the DC voltage, or the like, 8 is a controlling means for controlling ON/OFF of the switching means 7a, 7b, 7c, and 7d, 9 is a voltage detecting means for detecting voltage between electrodes, 10 is an average voltage detecting means for detecting an average voltage between the electrodes, 11 is a voltage comparing means for comparing the voltage detected value of the voltage detecting means 9 with a set value, and 12 is an average voltage comparing means for comparing the average voltage detected value of the average voltage detecting means 10 with a set value. In this manner, the electric discharge machining power supply system according to the embodiment 1 of the present invention employs the switching circuit having the bridge structure that can apply the voltages of both positive and negative polarities between the electrode 1 and the workpiece 2.

Figure 2:
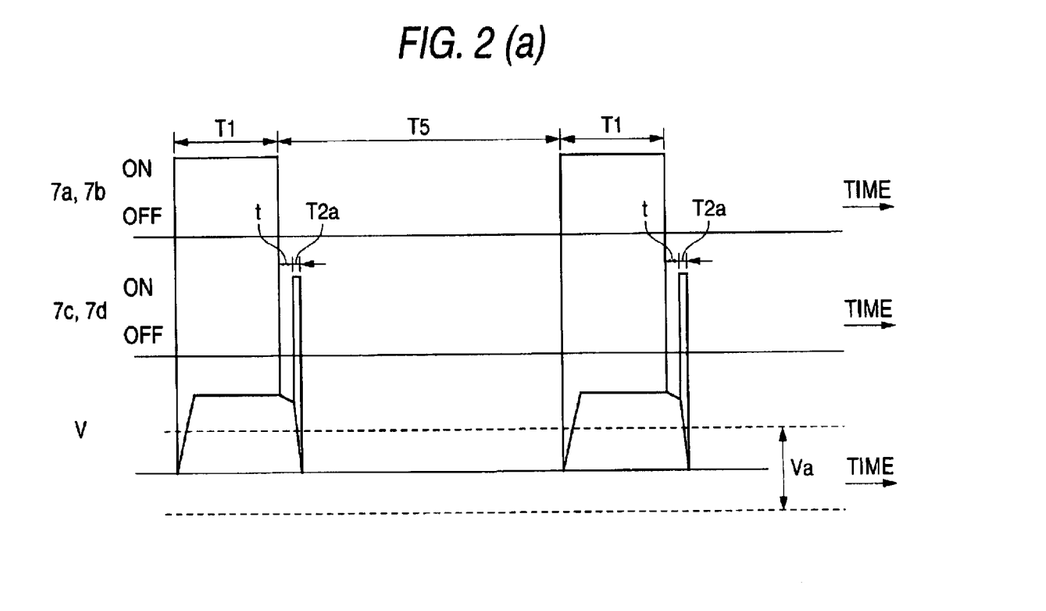
FIGS. 2A and 2B are views showing ON/OFF control of switching means and inter-electrode voltage waveforms in the electric discharge machining power supply system according to the embodiment 1 of the present invention.

FIG. 2 are views showing ON/OFF control of the switching means and inter-electrode voltage waveforms in the electric discharge machining power supply system according to the embodiment 1 of the present invention. FIG. 2A shows the case where the electric discharge is not generated at the end of a predetermined time T1, and FIG. 2B shows the case where the electric discharge is generated at the end of a predetermined time T1. In FIG. 2, V is an inter-electrode voltage, T1 is a voltage pulse applying time (a predetermined time in which the switching means 7a and 7b are turned ON), t is a predetermined time that is set to prevent the breakdown of the switching means, T2a and T2b are predetermined times in which the switching means 7c and 7d are turned ON after the predetermined time t has lapsed, T5 is a quiescent time, and Va is an inter-electrode voltage range that is smaller than the electric discharge starting voltage.

The switching means 7a and 7b are turned ON as shown in FIG. 2 based on the control signal from the controlling means 8 in FIG. 1, then the switching means 7a and 7b are turned OFF after the predetermined time T1 has lapsed, then the switching means 7c and 7d are turned ON after the predetermined time t has lapsed, and then the switching means 7c and 7d are turned OFF after the predetermined time T2a has lapsed in the case of FIG. 2(a) or after the predetermined time T2b has lapsed in the case of FIG. 2(b). As the predetermined times T2a and T2b, a predetermined time in which the inter-electrode voltage V comes up to any voltage in the voltage range Va (in the case of FIG. 2, the predetermined time in which the inter-electrode voltage V is reduced to zero) may be set previously.

In FIG. 2, the reason for the provision of the predetermined time t is that, if there exists the time period in which both the switching means 7a or 7b and 7c or 7d are simultaneously in their ON states, the short-circuit current is generated and the switching means are broken down. Thus, a time such as about 500 ns, for example, may be set as the predetermined time t. If the applied voltage is low, the value of this predetermined time t can be set short since the switching means having high operation speed can be employed. If the applied voltage is increased in response to either the type of the workpiece or high speed machining, the value of this predetermined time t must be set long since the switching means having high breakdown voltage but low operation speed must be employed.

If ON/OFF of the switching means can be controlled not to cause the time period in which the switching means 7a or 7b and 7c or 7d are turned ON simultaneously, there is no necessity to set the predetermined time t.

As described above, if the switching means 7c and 7d are turned ON in the predetermined time T2 after the application of the voltage pulse for the predetermined time T1 is ended, the voltage having the opposite polarity to the voltage in the predetermined time T1 can be applied. Therefore, in the switching circuit having the bridge configuration that can apply the voltage having both positive and negative polarities, as shown in FIG. 1, for example, the remaining voltage between the electrodes can be caused to fall down quickly as shown in FIG. 2.

In this manner, if the remaining voltage between the electrodes is caused to fall down quickly and is removed, the electrostatic force generated between the electrode and the workpiece by the remaining voltage can be suppressed. Accordingly, if the electric discharge machining power supply system according to the present invention is employed in the wire electric discharge machining, the vibration of the wire electrode can be suppressed. Therefore, the reduction in the machining precision of the workpiece can be prevented.

Also, the electric discharge due to the remaining voltage between the electrodes can be suppressed, and the electric discharge can be generated only within the time of for the application of the controllable voltage. Therefore, the machining quality can be improved.

In addition, the quiescent time T5 in FIG. 2 can be shortened and also the machining time can be reduced.

Furthermore, in the case that the relative movement between the electrode and the workpiece is carried out by the inter-electrode voltage, such a problem can be overcome that the electric discharge machining cannot be executed at a desired inter-electrode gap because of the presence of the remaining voltage between the electrodes.

Figure 3:
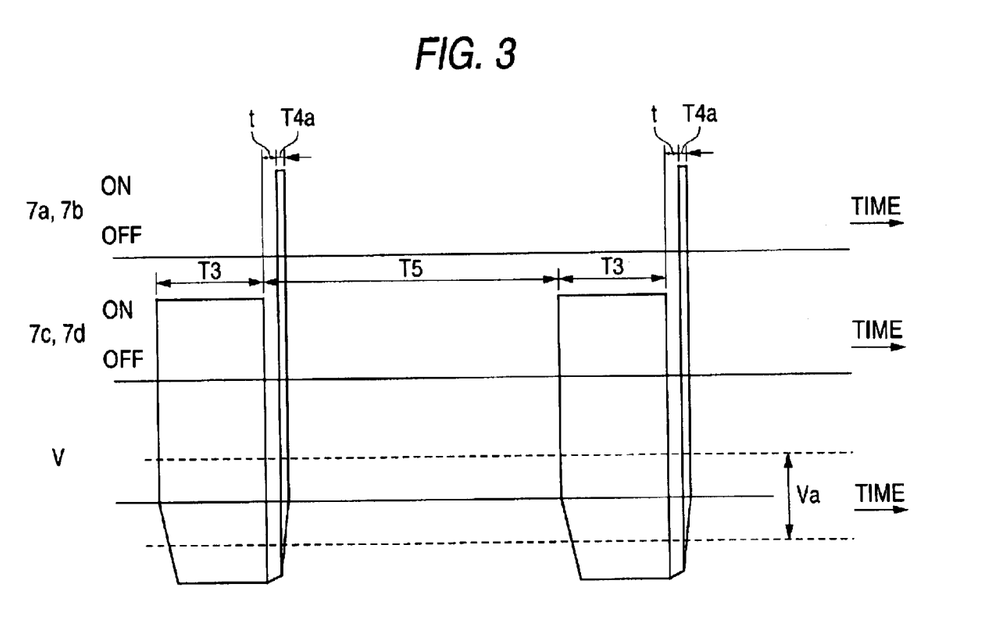
FIG. 3 is a view showing ON/OFF control of the switching means and the inter-electrode voltage waveforms in the electric discharge machining power supply system according to the embodiment 1 of the present invention.

Besides, even if the ON/OFF control of the switching means in FIG. 2 in the above explanation is carried out as shown in FIG. 3, the similar effect can be achieved.

Figure 4:
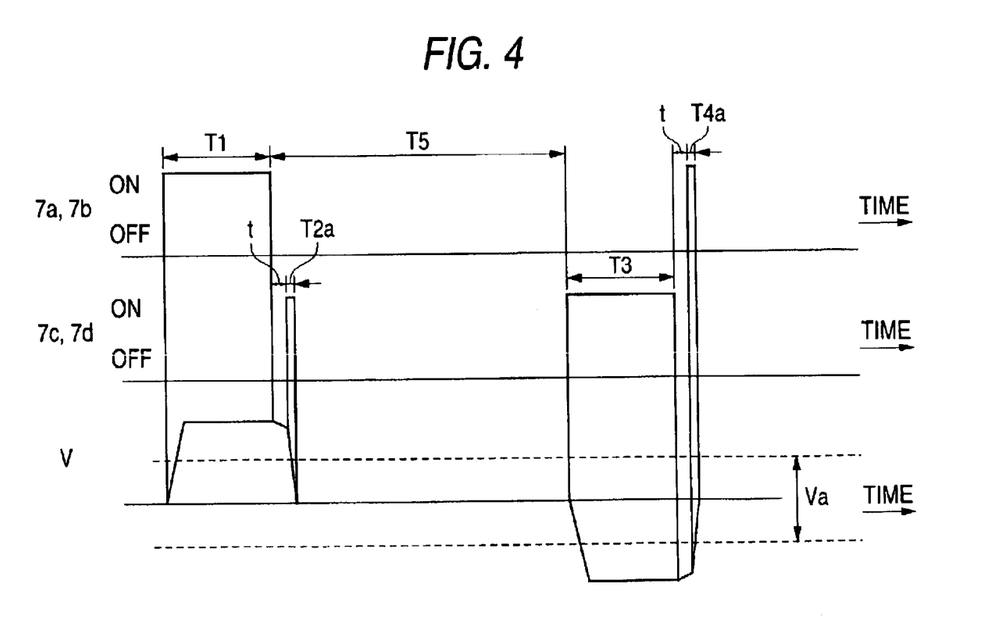
FIG. 4 is a view showing the ON/OFF control of the switching means and the inter-electrode voltage waveforms in the electric discharge machining power supply system according to the embodiment 1 of the present invention.

FIG. 4 shows the case where the voltage in the predetermined time T3 is set to have the opposite polarity to that of the voltage in the predetermined time T1. The similar effect to that in the case where the ON/OFF control of the switching means is carried out as shown in FIG. 2 can be achieved. In addition, in FIG. 4, if the average voltage detected value detected by the average voltage detecting means 10 and the voltage set value set to zero bolt are compared by the average voltage comparing means 12 and then the ON/OFF of the switching means 7a, 7b, 7c and 7d is controlled by the controlling means 8 to reduce this average voltage detected value into zero (the so-called zero-voltage control), the effect such that the electrolytic corrosion of the workpiece can be prevented can be achieved.

Embodiment 2

Figure 5:
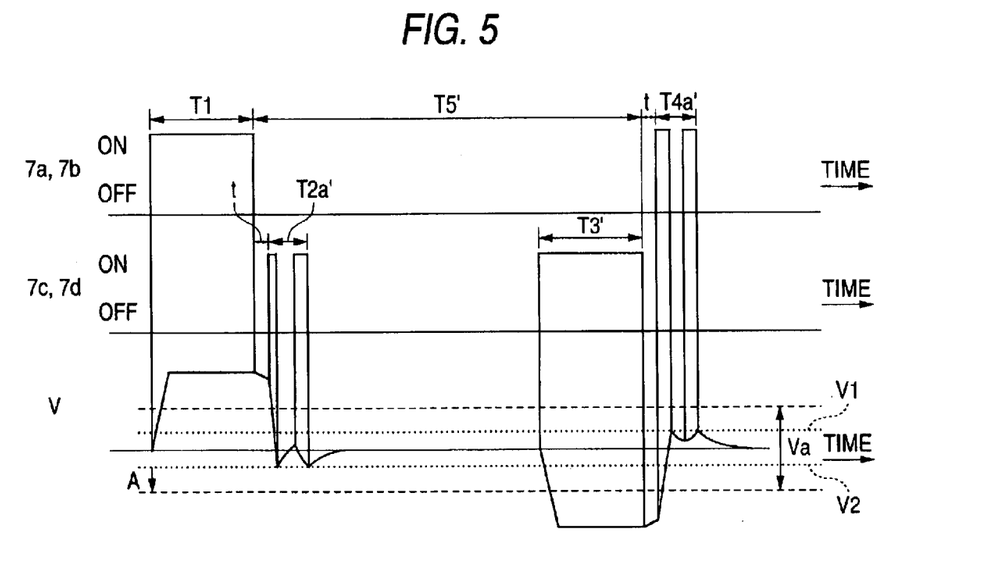
FIG. 5 is a view showing ON/OFF control of switching means and inter-electrode voltage waveforms in an electric discharge machining power supply system according to embodiments 2 and 3 of the present invention.

FIG. 5 is a view showing ON/OFF control of the switching means and an inter-electrode voltage waveform in an electric discharge machining power supply system according to embodiments 2 and 3 of the present invention. In FIG. 5, V is the inter-electrode voltage, Va is a range of the inter-electrode voltage that is below the electric discharge starting voltage, V1 and V2 are predetermined voltages within the voltage range Va, T1 is the voltage pulse applying time (the predetermined time in which the switching means 7a and 7b are turned ON), t is the predetermined time that is set to prevent the breakdown of the switching means, T2a' is a predetermined time in which the switching means 7c and 7d are ON/OFF-controlled after the predetermined times T1 and t have lapsed, T3' is a voltage pulse applying time (the predetermined time in which the switching means 7c and 7d are turned ON), T4a' is a predetermined time in which the switching means 7a and 7b are ON/OFF-controlled after the predetermined times T3' and t have lapsed, and T5, is a quiescent time. Also, the block diagram showing the configuration of the electric discharge machining power supply system is similar to FIG. 1 shown in the embodiment 1.

Since the remaining voltage between the electrodes is changed depending on the machining condition, the applied voltage, etc., the electric discharge machining power supply system according to the embodiment 2 controls to maintain the voltage between the electrodes within the predetermined voltage range in the voltage range Va after the falling of the voltage pulse, by the voltage detecting means 9, which detects the voltage between the electrodes in FIG. 1, and the voltage comparing means 11, which compares the predetermined voltage with the voltage between the electrodes in the positive and negative polarities respectively.

First the voltage having the positive polarity, for example, is applied for the predetermined time T1, then the voltage having the opposite polarity is applied not to break down the switching means after the predetermined time t has lapsed, then the voltage between the electrodes is detected by using the voltage detecting means 9, then the predetermined voltage V2 and the voltage between the electrodes are compared by using the voltage comparing means 11, then the switching means 7c, 7d are immediately turned OFF when such voltage between the electrodes reaches the predetermined voltage V2, and then ON/OFF of the switching means 7c, 7d is repeated for the predetermined time T2a' such that the inter-electrode voltage is not reduced below the predetermined voltage V2.

Also, the voltage having the opposite polarity side is applied for the predetermined time T3', then the voltage having the positive polarity side is applied not to break down the switching means after the predetermined time t has lapsed, then the voltage between the electrodes is detected by using the voltage detecting means 9, then the predetermined voltage V1 set within the inter-electrode range Va that is below the electric discharge starting voltage and the voltage between the electrodes are compared by the voltage comparing means 11, then the switching means 7a, 7b are immediately turned OFF when such voltage between the electrodes reaches the predetermined voltage V1, and then ON/OFF of the switching means 7a, 7b is repeated for the predetermined time T4a' such that the inter-electrode voltage does not exceed the predetermined voltage V1.

An ON/OFF duty of the switching means 7c, 7d during the time T2a' and an ON/OFF duty of the switching means 7a, 7b during the time T4a' may be set previously to a predetermined period respectively without using the voltage detecting means 9 and the voltage comparing means 11 such that the voltage between the electrodes can be maintained within a predetermined voltage range of the inter-electrode voltage range Va that is smaller than the electric discharge starting voltage.

If the ON/OFF control of the switching means as above is executed, not only the remaining voltage between the electrodes can be caused to fall down quickly but also the remaining voltage level between the electrodes can be reduced below the electric discharge starting voltage, after the predetermined voltage pulse applying times (T1 and T3') have lapsed. Thus, the similar effects to those in the embodiment 1 such that the machining quality can be improved since the electric discharge during the times T2a, and T4a' can be suppressed, etc. can be achieved.

Figure 6:
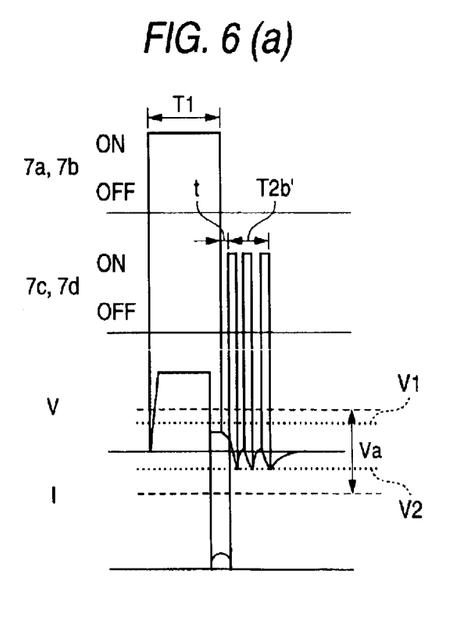
FIGS. 6A and 6B are views showing the ON/OFF control of the switching means and the inter-electrode voltage waveforms and the inter-electrode current waveforms in the electric discharge machining power supply system according to the embodiment 2 of the present invention when the electric discharge is generated.

FIG. 6A and B are views showing the ON/OFF control of the switching means and the inter-electrode voltage waveforms and the inter-electrode current waveforms in the electric discharge machining power supply system according to the embodiment 2 of the present invention when the electric discharge is generated. V is the inter-electrode voltage, I is an inter-electrode current, T1 is the voltage pulse applying time (predetermined time in which the switching means 7a and 7b are turned ON), t is the predetermined time that is set to prevent the breakdown of the switching means, and T2a' and T2b' are predetermined times in which the witching means 7a and 7b are ON/OFF-controlled after the predetermined times T1 and t have lapsed. As shown in FIG. 6(a), if the electric discharge is generated at the end of the predetermined time T1, the voltage reaches the predetermined voltage V2 in a short time since the voltage in the machining gap is within the voltage range Va. As a result, the first voltage pulse applying time in the time T2b', can be reduced, but the voltage in the predetermined time T2b' may be applied like FIG. 5. Also, as shown in FIG. 6(b), if the electric discharge is generated within the predetermined time T1 but the electric discharge is not generated at the end of the predetermined time T1, the voltage application in the time T2a' may be executed like FIG. 5. Also, in case the group pulse voltage employed in the finishing machining such as the 3-rd cut, the 4-th cut, etc., for example, is applied, the voltage application in the time T2b' or T2a' may be carried out depending on whether or not the electric discharge is generated at the end of the predetermined voltage pulse applying time, as shown in FIG. 6(a) or FIG. 6(b).

Embodiment 3

FIG. 5 is a view showing the ON/OFF control of the switching means and the inter-electrode voltage waveforms in the electric discharge machining power supply system according to the embodiment 3 of the present invention. The block diagram showing the configuration of the electric discharge machining power supply system is similar to FIG. 1 shown in the embodiment 1. However, in this embodiment 3, the voltage pulse applying time T3' is not a predetermined time but a controlled time.

In the embodiment 3, in order to prevent the electrolytic corrosion of the workpiece, the control of rendering the average voltage between the electrodes at the predetermined time interval into zero by using the average voltage detecting means 10 and the average voltage comparing means 12 in FIG. 1 (the so-called zero bolt control) is added to the embodiment 2. In other words, the average voltage between the electrodes in a predetermined time is detected by the average voltage detecting means 10, then this average voltage detected value and a voltage set value set to the zero bolt are compared by the average voltage comparing means 12, and then the applying time T3', of the voltage pulse having the opposite polarity to the voltage in the predetermined time T1 is controlled so as to reduce this average voltage detected value into zero (the control similar to the explanation of FIG. 4 in the embodiment 1 is executed), whereby the effect of capable of preventing the electrolytic corrosion of the workpiece can be achieved.

Also, in FIG. 5, if the predetermined voltage V2 is set as close as possible to the end area of the voltage range Va (i.e., the predetermined voltage V2 is set within the voltage range Va and near the electric discharge starting voltage) as indicated by an arrow A, for example, the average voltage having the opposite polarity to the voltage in the predetermined time T1 can be increased within the time T2$a$'. Therefore, if the zero bolt control is carried out, the voltage pulse applying time T3' in FIG. 5 can be shortened rather than the voltage pulse applying time T3 in FIG. 4 (i.e., T3'<T3 is obtained). Also, the voltage pulse applying time T3' can be further shortened by expanding the time T2$a$' much more. In this case, since the machining is easy to proceed at the voltage polarity in the predetermined time T1 but the machining is difficult to proceed at the voltage polarity in the predetermined time T3', the machining productivity is never lowered even if the voltage pulse applying time T3' is shortened.

The event that the voltage pulse applying time T3' can be shortened signifies the event that the time from the voltage pulse applying time T1 in FIG. 5 to the subsequent voltage pulse applying time T1 can be shortened. In other words, if the ON/OFF control of the switching means and the zero bolt control in FIG. 5 is carried out, not only the electrolytic corrosion of the workpiece can be prevented but also the machining time can be shortened.

In the above, the case where the control of the voltage pulse applying time for the zero bolt control is carried out in the time T3' is explained. But such control may be carried out in the time T1 or T4', for example.

In the above explanation of the embodiments of the present invention, the case where the configuration of the electric discharge machining power supply system is the bridge configuration using one DC power supply in FIG. 1 is shown. But any configuration that can apply the voltage of both positive and negative polarities between the electrode and the workpiece, for example, the configuration disclosed in the Unexamined Japanese Patent Application Publication No.Heil-257513 in which two DC power supplies are used, etc. may be employed.

Industrial Applicability

As described above, the electric discharge machining power supply system according to the present invention is suitable for the use in the electric discharge machining operation.

What is claimed is:

1. An electric discharge machining power supply system comprising:

a DC power supply for supplying a DC voltage between an electrode and a workpiece;

switching means for switching the DC voltage; and a controlling means for controlling ON/OFF of said switching means, whereby a voltage of both positive and negative polarities can be applied between electrodes; wherein said controlling means applies a first voltage pulse between said electrodes for a predetermined time, and then applies a second voltage pulse having a polarity opposite to the first voltage pulse for a predetermined time until the voltage between said electrodes is lowered to a predetermined voltage that is less than an electric discharge starting voltage.

2. An electric discharge machining power supply system comprising:

a DC power supply for supplying a DC voltage between an electrode and a workpiece;

switching means for switching the DC voltage; and a controlling means for controlling ON/OFF of said switching means, whereby a voltage of both positive and negative polarities can be applied between said electrodes; wherein said controlling means applies a first voltage pulse between said electrodes for a predetermined time, and then applies a second voltage pulse having a polarity opposite to the first voltage pulse at a predetermined period for a predetermined time such that the voltage between said electrodes is within a predetermined voltage range that is less than an electric discharge starting voltage.

3. An electric discharge machining power supply system comprising:

a DC power supply for supplying a DC voltage between an electrode and a workpiece;

switching means for switching the DC voltage; and a controlling means for controlling ON/OFF of said switching means so that a voltage of both positive and negative polarities is applied between said electrodes;

said system further comprising:

a voltage detecting means for detecting the voltage between said electrodes;

a voltage comparing means for comparing an inter-electrode voltage detected by said voltage detecting means with a predetermined voltage that is set lower than a electric discharge starting voltage; and a controlling means for controlling ON/OFF of said switching means, that apply a second voltage pulse having a polarity opposite to the first voltage pulse such that the inter-electrode voltage is set within a predetermined voltage range that is less than an electric discharge starting voltage, based on a compared value obtained by said voltage comparing means after a first voltage pulse is applied between said electrodes for a predetermined time.

4. The electric discharge machining power supply system according to any one of claims 1 to 3, wherein after application of the first voltage pulse is ended, the second voltage pulse is applied after a predetermined time is lapsed to prevent breakdown of said switching means.

5. An electric discharge machining power supply system comprising:
- a DC power supply for supplying a DC voltage between an electrode and a workpiece;
- switching means for switching the DC voltage; and
- a controlling means for controlling ON/OFF of said switching means, whereby a voltage of both positive and negative polarities is applied between said electrodes;

said system further comprising:
- a voltage detecting means for detecting the voltage between said electrodes;
- a voltage comparing means for comparing an inter-electrode voltage detected by said voltage detecting means with a predetermined voltage that is set lower than a electric discharge starting voltage;
- an average voltage detecting means for detecting an average voltage between said electrodes;
- an average voltage comparing means for comparing the average voltage between said electrodes detected by said average voltage detecting means with a zero bolt; and
- a controlling means for controlling ON/OFF of said switching means, that apply a second voltage pulse having a polarity opposite to the first voltage pulse such that the inter-electrode voltage is set within a predetermined voltage range that is less than an electric discharge starting voltage, based on a compared value obtained by said voltage comparing means after a first voltage pulse is applied between said electrodes for a predetermined time,
- controlling ON/OFF of said switching means, that apply a fourth voltage pulse having a same polarity as the first voltage pulse such that the inter-electrode voltage is set within a predetermined voltage range that is less than the electric discharge starting voltage, based on a compared value obtained by said voltage comparing means after a third voltage pulse having a polarity opposite to the first voltage pulse is applied between said electrodes for a predetermined time, and
- controlling the average voltage between said electrodes at a predetermined time interval into zero, based on a compared value obtained by said average voltage detecting means.

6. The electric discharge machining power supply system according to claim 5, wherein
the predetermined voltage that is less than the electric discharge starting voltage when the second voltage pulse is applied or the predetermined voltage that is less than the electric discharge starting voltage when the fourth voltage pulse is applied is set close to the electric discharge starting voltage.

7. The electric discharge machining power supply system according to claim 5, wherein
after application of the first voltage pulse is ended, the second voltage pulse is applied after a predetermined time has lapsed to prevent breakdown of said switching means, and
after application of the third voltage pulse is ended, the fourth voltage pulse is applied after a predetermined time is lapsed to prevent breakdown of said switching means.

* * * * *